(12) United States Patent
Declerck et al.

(10) Patent No.: US 7,929,799 B2
(45) Date of Patent: Apr. 19, 2011

(54) DEFORMATION OF MASK-BASED IMAGES

(75) Inventors: Jerome Declerck, Oxford Oxfordshire (GB); Thomas George Wright, Oxford Oxfordshire (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 991 days.

(21) Appl. No.: 11/806,655

(22) Filed: Jun. 1, 2007

(65) Prior Publication Data

US 2007/0297674 A1    Dec. 27, 2007

(30) Foreign Application Priority Data

Jun. 2, 2006   (GB) .................................. 0610757.7

(51) Int. Cl.
*G06K 9/20*     (2006.01)
*G06K 9/34*     (2006.01)

(52) U.S. Cl. ........................ 382/283; 382/173

(58) Field of Classification Search .................. 382/282, 382/283, 276, 291, 293, 173, 128
See application file for complete search history.

(56) References Cited

U.S. PATENT DOCUMENTS

| 6,121,979 | A | 9/2000 | Carver | |
|---|---|---|---|---|
| 2002/0141640 | A1* | 10/2002 | Kraft | .............. 382/167 |
| 2004/0156556 | A1 | 8/2004 | Lopez | |
| 2004/0249270 | A1* | 12/2004 | Kondo et al. | ................. 600/425 |

FOREIGN PATENT DOCUMENTS

GB          2 312 123 A    10/1997

* cited by examiner

*Primary Examiner* — Yon Couso
(74) *Attorney, Agent, or Firm* — Crowell & Moring LLP

(57) ABSTRACT

An image processing method is described that allows a user to manipulate regions of interest (ROIs) in a mask based image. The user defines a stretch vector for example by 'clicking and dragging' a mouse pointer and an algorithm deforms the ROI according to a roll-off function that avoids the non-smooth edge effects seen in prior art techniques such as paintbrushes.

18 Claims, 5 Drawing Sheets

[ADCH], [ABCF], [AEFH], [CFGH]    [ACFH]

DEFORMATION OF MASK-BASED IMAGES

The invention is concerned with the processing of digital images and, in particular, with the deformation of regions of segmented regions of the image, to facilitate further analysis/processing.

Users of image processing software such as medical practitioners often wish to create regions of interest (ROIs) corresponding to some region of the underlying image (for example for segmentation, which separates the image into regions). The types of tools that are appropriate for the creation of such regions depend on the underlying representation of the ROI in the source image. For example, if the ROI is represented and wholly defined as a contour, 2D control point manipulations may be appropriate, or if the ROI is a mesh, 3D manipulation of nodes may be useful However, contours and meshes do not provide a flexible enough representation for regions of interests with more complex shapes or complex topology. Contours require a modeling of the region to be segmented, which is not always possible. To enable a more generic representation of the contours, binary masks can be used, in which each voxel in the ROI has a one to one correspondence with a voxel in the underlying image. Such masks do not have a parametric representation that permits easy manipulation from a corner or control point as contours and meshes do.

The present invention is concerned with the case when ROIs are represented by binary masks by allowing deformation of the ROI shape without the need of a parametric representation.

Among the tools that have been used for mask-based ROI manipulation with some success are 3D paintbrushes. However, these are associated with one significant disadvantage: because the brush is finite (has no roll-off), non-smooth edge-effects that are difficult to remove later are created.

Approaches have also been developed for contour- and mesh-based ROI representations (see, e.g., Shechter, J. M. Declerck, C. Ozturk, and E. R. McVeigh. "Fast Template Based Segmentation of Cine Cardiac MR", *Proceedings of the 7th Scientific Meeting of the International Society for Magnetic Resonance in Medicine*, Philadelphia, Pa., May 1999). In particular, the manipulation of ROIs represented by contours (in 2D) or meshes (in 3D) by dragging control points is one of the most common methods of changing the shape. The method works well, but creating the mesh structure in the first place is usually a costly step (particularly when using a mask-based representation of the ROI). Avoidance of this step is desirable when the structures to be segmented are complex.

The present invention addresses a requirement for a tool that allows a user to select a mask-based ROI in a source image and manipulate said ROI by simple interactive operations such as 'clicking and dragging' of a computer mouse, as one would do to manipulate control points if there were any.

According to the invention, a method of deforming a mask-based image comprises the steps set out in claim 1 attached hereto.

The invention will now be described by non-limiting example, with reference to the following figures in which.

Throughout this description, the invention is exemplified by reference to both two-dimensional (2-D) cases and three-dimensional cases. Neither of these should be seen as limiting as the invention is equally applicable to both.

Figure 1A:
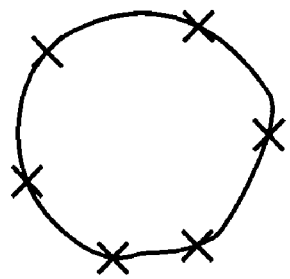
FIGS. 1a and 1b illustrate the deformation of regions of interest represented by contours by dragging control points.
Figure 1B:
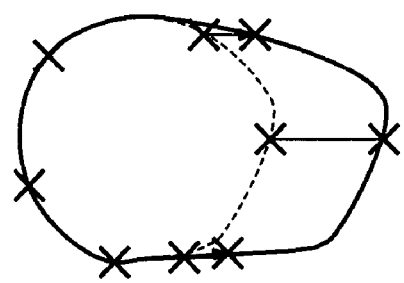

Referring to FIG. 1a, a contour represented by a smooth curve is entirely defined by a set of control points (crosses). Referring to FIG. 1b, the contour prior to deformation is shown in dashed lines, To deform the contour, control points can be displaced, thereby defining a new shape in a very simple manner.

Figure 2A:
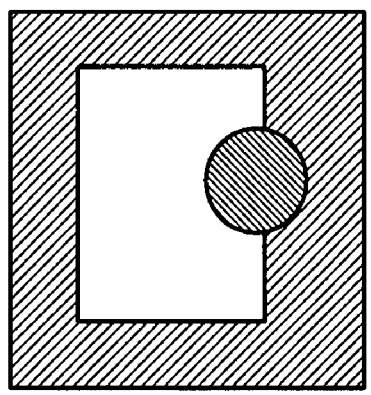
FIGS. 2a and 2b illustrate the use of a paintbrush tool to deform a mask-based region of interest in an image.
Figure 2B:
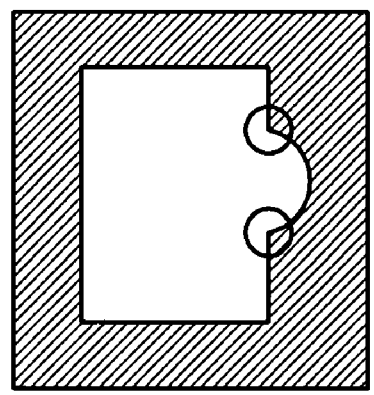

Referring to FIG. 2a, a circular paintbrush (grey) is used to extend a region of interest (white). The extended region of interest is shown in FIG. 2b with the non-smooth effects arising from the finite nature of the brush being circled.

Figure 3A:
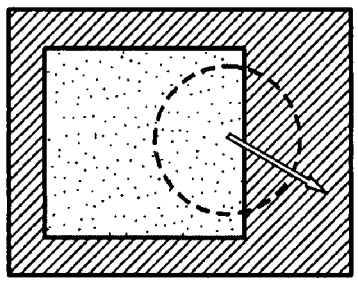
FIGS. 3a and 3b illustrate the application of the current invention to a masked based region of interest.

Referring to FIG. 3a, by one embodiment of the current invention a user is able to select a point from which to drag and then stretch the ROI as required, in any direction. Points that are further away from the selected start point will be moved less than those nearer to it; points that are beyond a certain distance away will not be moved at all (in the present embodiment, this distance is a parameter of the algorithm used).

Figure 3B:
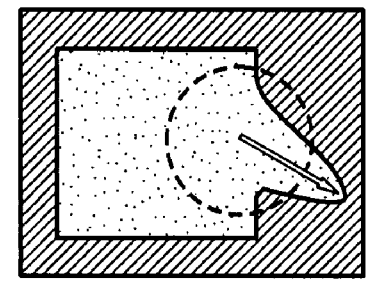

For clarity, FIGS. 3a and 3b illustrate the invention as applied to a two-dimensional image but application in three dimensions (3D) is equally valid.

The "roll-off" function ensures that changes made to the ROI are smooth. The dashed circle (sphere in 3D) defines the region for which the roll-off function is non-zero. Pixels (voxels in 3D) that are outside this region are not affected by the stretching operation.

The following properties define the term "roll-off function" as used in describing the current invention:
- the function has a value of one at the centre to ensure that the point the user dragged moves exactly as specified
- the function has a value of zero (or near zero) at the edge of the region affected to allow for continuous transition between those voxels that move and those that don't
- the function is monotonic for each half, in each dimension independently (increasing in the left half, decreasing in the right half) to ensure that the deformation varies monotonically between those points at the edge that do not move, and those in the centre that move the furthest;
- the function is continuous, to ensure smooth, continuous deformations.

These properties are mathematical translations of a definition of a function which has a large value in its centre and decreases continuously with from the centre. The function could be 'strictly decreasing' i.e. the value is always reduced as the distance from the centre is increased, or it could be 'non-strictly' decreasing, for example having a constant value along a certain distance.

Variations are acceptable, depending on the desired final result. For instance, in addition to the above, the following properties, whilst not strictly required, lead to a visually more pleasing result:

zero (or negligible) derivative on the boundary, to ensure that the roll-off smoothly transitions between voxels that move, and those that don't zero derivative in the centre (where the stretch originates from) to ensure that points local to this position are effectively translated by the stretching operation smoothness (continuous function, derivative and ideally second derivative, although that the latter is not vital) to lead to a smoothly transformed ROI One such function that satisfies these properties is a truncated 3D Gaussian, but other functions such as B-splines could also be used.

Other constraints to ensure that the topology of the ROI is preserved could be applied, but this is not always desirable when performing segmentation.

During execution of the current invention, a user defines the centre of the deformation (stretch) e.g., by a mouse click on a point in the initial ROI. The vector defining the stretch is defined (e.g., by dragging the mouse pointer from the centre to a new point) and the updated ROI is created as follows.

A set of pixels (voxels in the 3-D case) is selected in the initial ROI and for each of these, a corresponding pixel that will be in the updated ROI is identified. The corresponding pixels in the updated ROI are separated from those in the initial ROI in a direction parallel with the initial stretch vector and by a distance that varies (according to the roll-off function) with the distance between the pixel in the initial ROI and the origin of the stretch vector. The value of each of the corresponding pixels in the updated ROI is set according to the value of the pixel in the initial ROI.

Figure 4A:
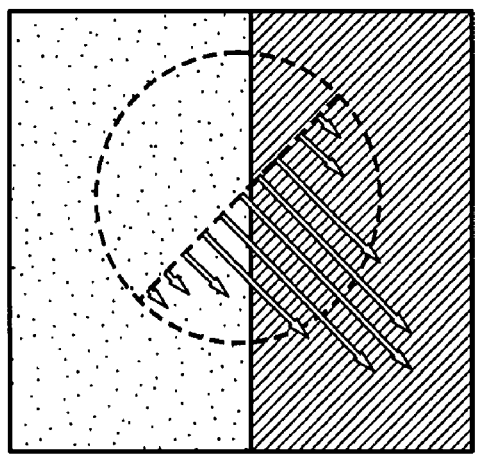
FIGS. 4a and 4b show two example sets of vectors used to identify which pixels or voxels in an image, deformed according to the invention, correspond to pixels or voxels in the image prior to deformation.
Figure 4B:
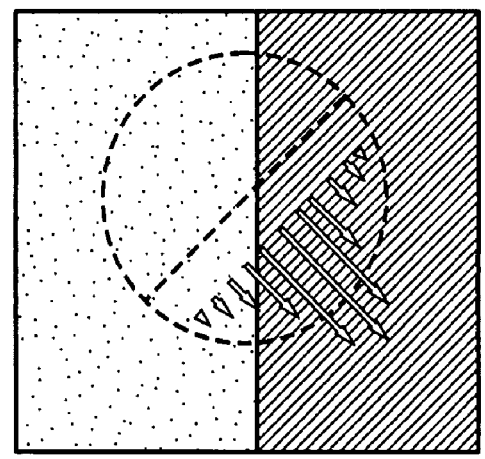

To begin, many vectors originating from within the region affected (indicated by the circle in FIG. 3) are created, with each vector pointing in the same direction as the vector created by the user, but with magnitude dictated by the roll-off function. Two example sets of vectors are illustrated by the arrows in FIG. 4 (in practice there will be many more sets of vectors, even in the 2D case). The lengths of the arrows in the right plot are shorter than those in the left plot due to the effect of the roll-off function.

Each of the vectors is interpreted as follows: if the pixel at the origin of the vector is on, the pixel at the head of the vector is set to on; if the pixel at the base of the vector is off, the pixel at the head of the vector is left alone.

In summary, at a high level, the algorithm for one embodiment of the invention is as follows:
1. Determine the region of the output ROI that could potentially be affected (this is not essential but increases computational efficiency by limiting the processing only to those pixels that could be affected);
2. Generate enough vectors so that it is guaranteed that no holes that were not present in the original ROI will be created in the output ROI
3. Process each vector: if the pixel at the base is on (i.e., has value one), set the pixel at the tip of the vector in the output ROI to on.

This summary raises three further questions that must be answered before the algorithm can be implemented:
1. what is the region of the output ROI that could potentially be affected?
2. how should the vectors be defined to ensure that no holes appear in the output ROI (holes occur when not every pixel in the output ROI has a vector terminating therein)?
3. should it be desired in the segmentation step, how can the topology of the ROI be preserved through the deformation step?

The answers to these questions are given in the following sections.

1. Determination of the Region of the Output ROI that can be Affected.

Figure 5:
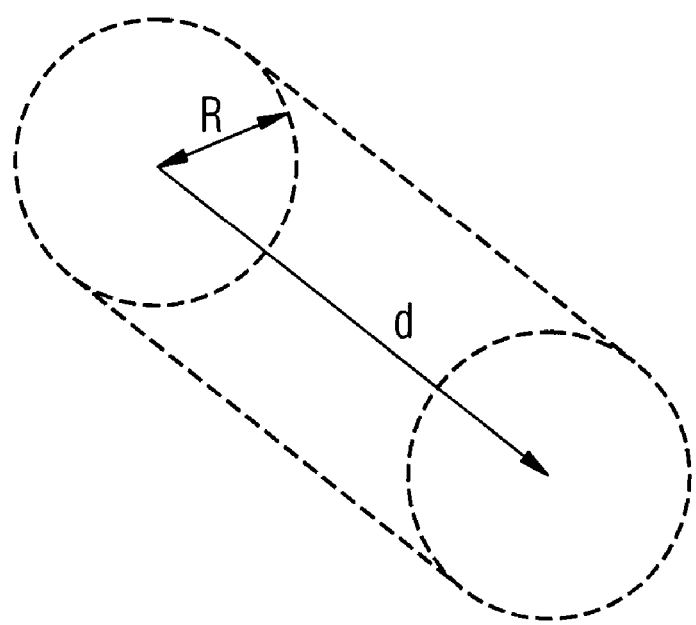
FIG. 5 illustrates in 3-D the voxels that are affected when a region of interest is deformed according to the invention.

Suppose that the user drags the mouse as indicated by vector d in FIG. 5. Taking the 3-D case, it is known that all voxels within a sphere (hereafter known as the 'source sphere') of a certain radius R will be affected (in one embodiment, this radius is a parameter of the algorithm but in others, the algorithm would facilitate input by the user of a value for R), and since voxels at the outer extreme of this sphere will not move very far due to the effects of the roll-off far from the centre, the method could potentially end up modifying voxels at the edges of this sphere. At the other end of the vector d, it is possible that vectors originating along the path of d will extend further than the original vector (although the effect of the roll-off function will ensure that this is only true for vectors originating relatively close to the start of d); however, it is not possible for vectors to extend further than a sphere of the same radius as the source sphere, since this would require a vector of the same length as d originating from the edge of the first sphere, which, due to the roll-off function, cannot occur. In conclusion then, only the voxels enclosed by the dashed lines can be affected by the algorithm; in three dimensions this object is a cylinder with hemispherical ends. This shape is fully defined by the sole parameters d and R. Other shapes could also be defined in a similar fashion, depending on the roll-off behaviour specified (one could imagine a non symmetric roll-off whereby, when looking in the direction of the vector, the left side of the vector is rolled off faster than the right side. The key element is to ensure that all voxels in 3D which can be affected by the roll-off behaviour can be identified.

2. Definition of the Vectors

There are at least two approaches that can be taken in defining the vectors: either the holes created between the heads of neighbouring vectors must be filled using a separate approach, or enough vectors must be defined to ensure that every output voxel is hit at least once, ensuring that no holes are generated in the first place.

a. Filling Holes

Using this approach in its simplest form, one vector is assigned to each of the eight corners of every original ROI voxel within the source sphere that is 'on'. If all voxels within the bounding cuboid of the source sphere are considered, there are a maximum of (m+1)(n+1)(p+1) vectors (for an m by n by p bounding box), since many vectors will be shared by eight neighbouring voxels. The eight vectors from each voxel are then be transformed using the roll-off function, and any voxels in the output ROI that fall inside the warped cuboid defined by these vectors set to on. If this is repeated for every voxel that is 'on', it is not possible for the result to contain holes that were not present in the original ROI.

Figure 6:
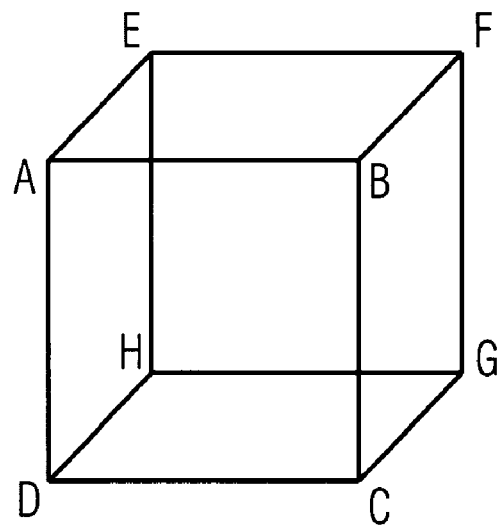
FIGS. 6 and 7 illustrate some of the mathematical considerations necessary during the step of generating the vectors illustrated in FIGS. 4a and 4b and FIG. 8 illustrates certain features of the roll-off function that are necessary to preserve the topology of the region of interest.
Figure 6:
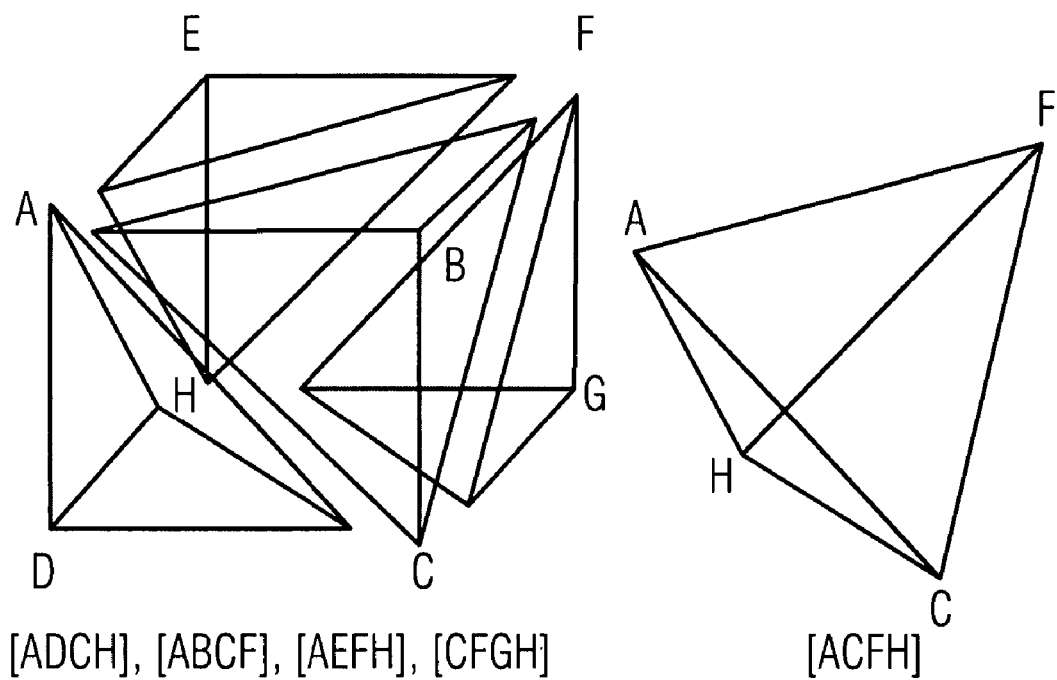

One method of computing the image of the warped voxel is to break the original voxel up into five tetrahedra as shown in FIG. 6, and transform the vertices of each of these using the roll-off function. The images of any of the tetrahedra will still be a tetrahedron, and voxels whose centres lie within the tetrahedron can be easily set to 'on' using standard computer graphics techniques. In 2D, the cuboid is reduced simply to a rectangle and the subdivision of the cuboid is simply a division of the rectangle in two triangles. Computer graphics routines for filling a triangle in an image are well known and can be made very efficient.

b. Ensuring that No Holes are Generated

Figure 7A:
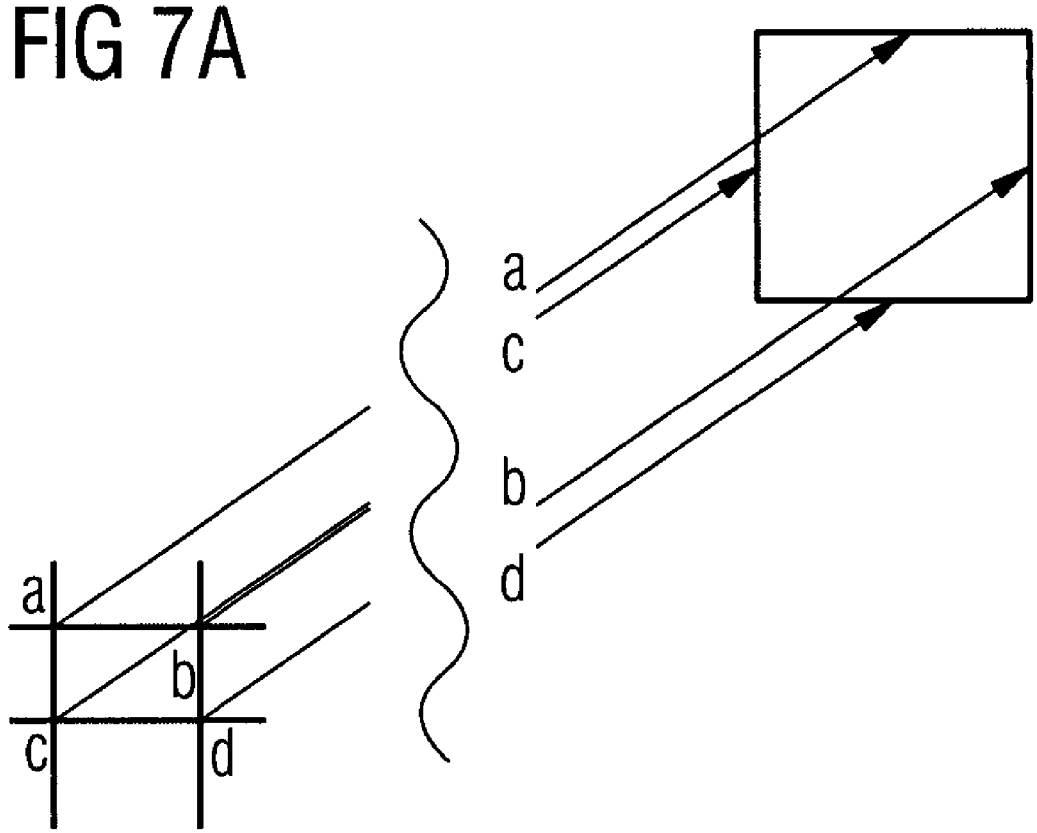

The goal in defining the vectors with this approach is to ensure that each voxel within the region of the output ROI that is affected by the transformation is touched by the tip of at least one vector. For simplicity (and computational efficiency), the 'start' of the vectors is defined using an irregular, axis-aligned grid (i.e., a grid that is defined by (possibly) irregular spacing in each of the three dimensions); the vector starting at each grid-point is then uniquely determined by the roll-off function and the stretch vector (i.e., the vector d in FIG. 5). Hence a grid spacing needs to be determined which ensures that it is not possible for the heads of a group of neighbouring vectors to completely surround a voxel without at least one of them terminating within it. As a 2-D example, a pixel is shown in FIG. 7a that is surrounded by four vectors, none of which actually terminate within the pixel itself.

This is a worst case situation, in which the four neighbouring vectors just fail to touch a particular pixel.

Figure 7B:
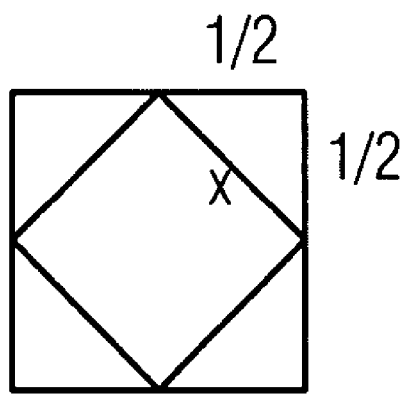

Working (without loss of generality) with pixel dimensions of 1 by 1, if it can be ensured that the heads of any two neighbouring vectors are within $$r = 1/\sqrt{2}$$

of each other (FIG. 7b), then this worst case situation cannot occur and all pixels in the output must be touched. Although the working described above is in 2D, exactly the same maximum distance is also applicable to 6 neighbouring vectors surrounding a 3D voxel.

Now that it is established how close the heads of neighbouring vectors should be, it is still necessary to work out the grid-spacing to use for the starting points of the vectors. The mathematics given in the appendix shows that any two neighbouring vectors starting at points $s_i$ and $s_{i+1}$ must satisfy $$\|s_{i+1} - s_i + |g_{x_{i+1}} - g_{x_i}|\mathrm{abs}(d)\| < \frac{1}{\sqrt{2}}$$

(where d is the user-defined stretch vector and $g_{x_i}$ is the value of the 3D roll-off function at the x-coordinate of the point $s_i$ (similarly for $g_{x_{i+1}}$)). Now, given the starting point of one vector, so the next starting point $s_{i+1}$ can be determined using the iteration described in the appendix. Starting at the top-left-back corner of the bounding box of the source sphere and working in the three dimensions independently, the irregular grid of starting points can be completely defined, with all voxels in the output will be touched by at least one vector.

3. Preservation of ROI Topology

The topology of the ROI will be preserved if the displacement field that is applied does not wrap around itself. Without loss of generality, it can be supposed that the displacement is made in the x direction only. The generalisation can be made easily by rotation of the axes.

Figure 8:
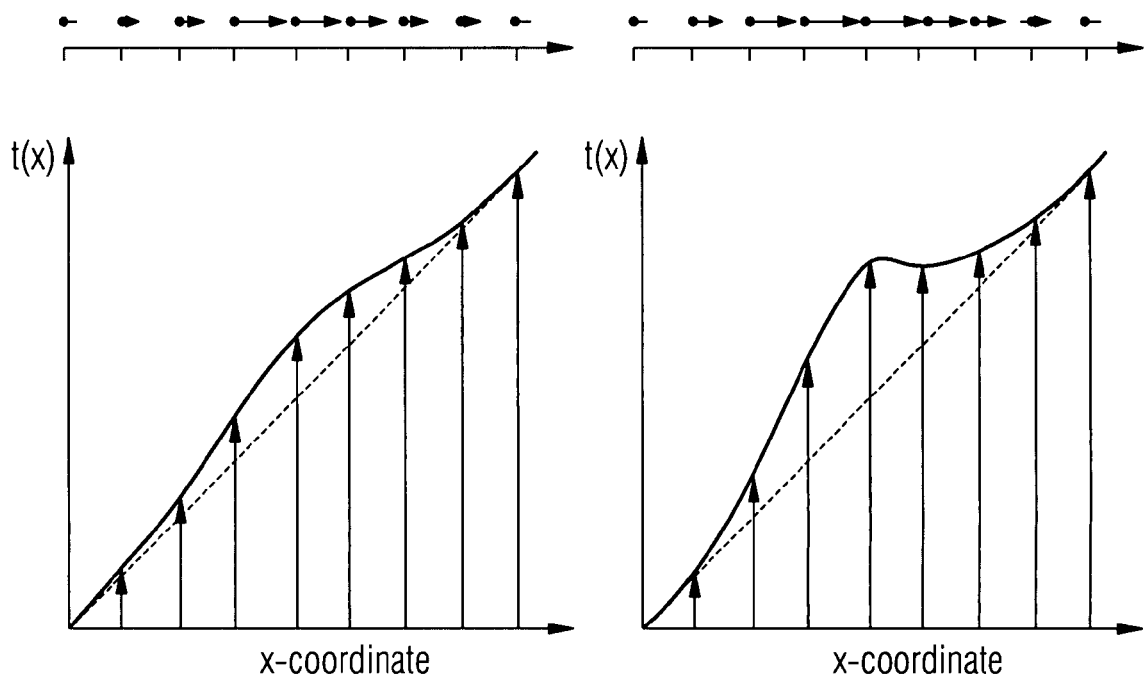

In FIG. 8, a series of vectors are drawn to simulate the displacement field and the roll-off function. Below the vectors, the graph shows the value of the new coordinate of the voxel to be transformed as a function of the value of the coordinate of that voxel. If the displacement is restricted in the x direction, the transformed coordinate t is the sum of the original coordinate and the roll-off function. If the roll-off function g is defined in normalised coordinates (between −1 and 1) and has values between 0 and 1, the effective displacement that is applied to the voxel is $$\mathrm{displacement} = d \cdot g\left(\frac{r}{R}\right)$$

where r is the distance to the origin of the stretch vector. The transformed coordinate is then expressed as:

$$t(r) = r + d \cdot g\left(\frac{r}{R}\right)$$

The condition for the topology of the ROI to be preserved is that t is an invertible function of r. This is ensured if the derivative of t is always strictly positive.

The derivative of t is then:

$$t'(r) = 1 + \frac{d}{R} \cdot g'\left(\frac{r}{R}\right) > 0$$

In order to ensure that the derivative is always positive, the constraint that ties d, R and g is:

$$|\max(g')| < \frac{R}{d}.$$

Given a particular displacement imposed by the user, this topology preservation constraint can be enforced by either:
  setting a maximum norm for d given R.
  having a R which changes as a function of d so that the derivative of t remains positive Both examples will ensure preservation of the topology of the ROI, but the user feedback will be different. Both may be desirable depending on the particular application.

Typical Application of the Invention

A typical application of the invention would be for the segmentation of structures using the following steps:
  1) the user chooses a generic structure (e.g., cube, sphere, or predefined anatomical shape);
  2) the user sets a global rotation and scaling factor to the shape to place it roughly at the desired location;
  3) the user refines the shape using gross strokes of the mouse, with a large roll-off factor;
  4) the user refines the details of the shape with a smaller roll-off factor.

APPENDIX

This appendix describes how the vectors can be placed so that no holes result in the creation of the warped ROI.

Given a user-defined stretch vector d, and any two neighbouring vectors $a_i$ and $a_{i+1}$ originating from source points $s_i$ and $s_{i+1}$, which have their tips at $v_i$ and $v_{i+1}$, the tips should lie within $$\frac{1}{\sqrt{2}}$$

of each other:

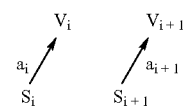

In other words, $$\|v_{i+1} - v_i\| < \frac{1}{\sqrt{2}},$$

and in order to obtain this, the step size, $\|s_{i+1}-s_i\|$ can be controlled. Now, we know that $v_i = s_i + g_{x_i} g_{y_i} g_{z_i} d$ (and similarly for $v_{i+1}$), where $g_{x_i} g_{y_i} g_{z_i}$ is the value of the roll-off function at $s_i$ (normalised so that the value at the central point is 1, giving us the full magnitude of the user's vector d). Substituting the above definitions of $v_i$ and $v_{i+1}$ into the inequality, $$\|s_{i+1} + g_{x_{i+1}} g_{y_{i+1}} g_{z_{i+1}} d - (s_i + g_{x_i} g_{y_i} g_{z_i} d)\| < \frac{1}{\sqrt{2}} \Leftrightarrow$$

$$\|s_{i+1} - s_i + (g_{x_{i+1}} g_{y_{i+1}} g_{z_{i+1}} - g_{x_i} g_{y_i} g_{z_i}) d\| < \frac{1}{\sqrt{2}}.$$

Considering the special situation in which the grid is computed one dimension at a time (i.e., firstly in x, then y, then z), and considering without loss of generality only the x-grid, for any particular row of the grid, the equalities $g_{y_i} = g_{y_{i+1}}$ and $g_{z_i} = g_{z_{i+1}}$ apply, leading to $$\|s_{i+1} - s_i + (g_{x_{i+1}} - g_{x_i}) g_{y_i} g_{z_i} d\| < \frac{1}{\sqrt{2}}. \quad (1)$$

Since the aim is to have a grid that has the same column-spacing for all rows on all slices (this is the definition of an irregular grid), the values of $g_{y_i}$ and $g_{z_i}$ should be chosen such that the norm in (1) is maximised, thus ensuring that the inequality will be satisfied for all rows in the grid. Assuming that the x-grid points are computed in order of increasing x position, for any particular row of the grid $$s_{i+1} - s_i = \begin{pmatrix} \text{step} \\ 0 \\ 0 \end{pmatrix}, \text{step} > 0.$$

Rewriting (1) with this in mind, the inequality becomes $$\left\| \begin{pmatrix} \text{step} + (g_{x_{i+1}} - g_{x_i}) g_{y_i} g_{z_i} d_x \\ (g_{x_{i+1}} - g_{x_i}) g_{y_i} g_{z_i} d_y \\ (g_{x_{i+1}} - g_{x_i}) g_{y_i} g_{z_i} d_z \end{pmatrix} \right\| < \frac{1}{\sqrt{2}}.$$

Now, the norm on the left hand side of this equation can be bounded:

$$\left\| \begin{pmatrix} \text{step} + (g_{x_{i+1}} - g_{x_i}) g_{y_i} g_{z_i} d_x \\ (g_{x_{i+1}} - g_{x_i}) g_{y_i} g_{z_i} d_y \\ (g_{x_{i+1}} - g_{x_i}) g_{y_i} g_{z_i} d_z \end{pmatrix} \right\| \leq \left\| \begin{pmatrix} \text{step} + |(g_{x_{i+1}} - g_{x_i}) g_{y_i} g_{z_i} d_x| \\ |(g_{x_{i+1}} - g_{x_i}) g_{y_i} g_{z_i} d_y| \\ |(g_{x_{i+1}} - g_{x_i}) g_{y_i} g_{z_i} d_z| \end{pmatrix} \right\|$$

$$\leq \left\| \begin{pmatrix} \text{step} + |(g_{x_{i+1}} - g_{x_i}) d_x| \\ |(g_{x_{i+1}} - g_{x_i}) d_y| \\ |(g_{x_{i+1}} - g_{x_i}) d_z| \end{pmatrix} \right\|,$$

since the roll-off values are scaled to ensure that the maximum value is 1 (i.e., the maximum displacement is attained at the point the user dragged the ROI to). This leads us to the following inequality that must be satisfied to guarantee that all voxels are hit:

$$\left\| \begin{pmatrix} \text{step} + |(g_{x_{i+1}} - g_{x_i}) d_x| \\ |(g_{x_{i+1}} - g_{x_i}) d_y| \\ |(g_{x_{i+1}} - g_{x_i}) d_z| \end{pmatrix} \right\| = \|s_{i+1} - s_i + |(g_{x_{i+1}} - g_{x_i})| \text{abs}(d)\| < \frac{1}{\sqrt{2}}. \quad (2)$$

The problem is now that both $g_{x_i}$ and $g_{x_{i+1}}$ depend on the step size that has been taken, and although it can be tested whether a particular step size is acceptable, it is not easy to directly compute such a step size. However, this problem can be surmounted by using an iterative approach. It is clear that the largest step size is $$\frac{1}{\sqrt{2}},$$

which is only valid when all components of the stretch vector are 0. It is also clear that taking a step size of 0 will always satisfy the inequality, and that the value of the norm of the vector in (2) is monotonic in the size of the step (for each half of the roll-off function, independently). Thus, starting with a step size of $$\frac{1}{\sqrt{2}},$$

if we continually reduce it, eventually we will have a step size that satisfies (2).

The only unknown now is how much to reduce the step at each iteration. At odds here are the desire to have the step size as large as possible (to define as few vectors as possible, and hence make the computation faster), and to minimise the number of iterations required (to avoid spending time on this part of the computation). Two possible strategies are to reduce the distance by a fixed amount, say 0.05 voxels, at each iteration (although this would cause problems if the inequality were still not satisfied when the points were only 0.05 apart), or simply to halve the distance at each iteration (although this will mean that the maximum step size used will always be $$\frac{1}{2\sqrt{2}},$$

since the inequality will never be satisfied on the first iteration, and this could result in additional, unnecessary vectors being defined).

A strategy of subtracting 0.05 until the distance is less than 0.1, then halving the distance at each iteration combines the benefits of both of these approaches into a robust algorithm.

The invention claimed is:
1. A method of processing a mask-based image by deforming an input Region of Interest (ROI) in the image to produce an output ROI, said method comprising the steps of:
   i) receiving, by a computer, a definition of a stretch vector on the input ROI;

ii) generating, by the computer, a plurality of vectors originating in the input ROI, each vector being parallel to the stretch vector and having a magnitude determined by a roll-off function, g, said function having a value that decreases continuously with distance in any direction between the origin of the stretch vector and the origin of the generated vector, from a value of one at the origin of the stretch vector to a value of substantially zero at some point distal to the origin of the stretch vector, and iii) processing, by the computer, each vector such that the value of a voxel or pixel in which a vector terminates is adjusted according to the value of the voxel or pixel at the origin of each vector.

2. A method according to claim 1, where the value of a voxel or pixel in which a vector terminates is set to one if the value of the voxel or pixel at the origin of the vector is one and is left unchanged if the value of the voxel or pixel at the origin of the vector is zero.

3. A method according to claim 1, where the value of a voxel or pixel in the output region of interest in which no vector terminates is adjusted according to the adjusted value of one or more neighboring voxels or pixels in which a vector does terminate.

4. A method according to claim 1, wherein the vectors are generated such that at least one vector terminates in every voxel or pixel in the output region of the output ROI.

5. A method according to claim 1, where g', the first derivative of g with respect to distance from the origin of the stretch vector, is substantially zero at the edge of the region determined in step ii).

6. A method according to claim 1, where g' is substantially zero at the origin of the stretch vector.

7. A method according to claim 1, where g' is a continuous function.

8. A method according to claim 1, where g'', the second derivative of g with respect to distance from the origin of the stretch vector, is a continuous function.

9. A method according to claim 1, wherein the stretch vector having a magnitude d, the region defined at step ii) having a radius R and the roll-off function g are defined such that:

$$|\max(g')| < \frac{R}{d}.$$

10. A non-transitory computer-readable medium including computer code for processing a mask-based image by deforming an input Region of Interest (ROI) in the image to produce an output ROI, the computer code, when executed by a computer, causes the computer to:

i) receive a definition of a stretch vector on the input ROI;

ii) generate a plurality of vectors originating in the input ROI, each vector being parallel to the stretch vector and having a magnitude determined by a roll-off function, g, said function having a value that decreases continuously with distance in any direction between the origin of the stretch vector and the origin of the generated vector, from a value of one at the origin of the stretch vector to a value of substantially zero at some point distal to the origin of the stretch vector, and iii) process each vector such that the value of a voxel or pixel in which a vector terminates is adjusted according to the value of the voxel or pixel at the origin of each vector.

11. A non-transitory computer-readable medium according to claim 10, where the value of a voxel or pixel in which a vector terminates is set to one if the value of the voxel or pixel at the origin of the vector is one and is left unchanged if the value of the voxel or pixel at the origin of the vector is zero.

12. A non-transitory computer-readable medium according to claim 10, where the value of a voxel or pixel in the output region of interest in which no vector terminates is adjusted according to the adjusted value of one or more neighboring voxels or pixels in which a vector does terminate.

13. A non-transitory computer-readable medium according to claim 10, wherein the vectors are generated such that at least one vector terminates in every voxel or pixel in the output region of the output ROI.

14. A non-transitory computer-readable medium according to claim 10, where g', the first derivative of g with respect to distance from the origin of the stretch vector, is substantially zero at the edge of the region determined in step ii).

15. A non-transitory computer-readable medium according to claim 10, where g' is substantially zero at the origin of the stretch vector.

16. A non-transitory computer-readable medium according to claim 10, where g' is a continuous function.

17. A non-transitory computer-readable medium according to claim 10, where g'', the second derivative of g with respect to distance from the origin of the stretch vector, is a continuous function.

18. A non-transitory computer-readable medium according to claim 10, wherein the stretch vector having a magnitude d, the region defined at step ii) having a radius R and the roll-off function g are defined such that:

$$|\max(g')| < \frac{R}{d}.$$

* * * * *